US012683675B2

(12) United States Patent
Navarro

(10) Patent No.: US 12,683,675 B2
(45) Date of Patent: Jul. 14, 2026

(54) AIRBORNE SATELLITE CONNECTIVITY SYSTEM

(71) Applicant: The Boeing Company, Arlington, VA (US)

(72) Inventor: Julio Navarro, Kent, WA (US)

(73) Assignee: The Boeing Company, Arlington, VA (US)

( * ) Notice: Subject to any disclaimer, the term of this patent is extended or adjusted under 35 U.S.C. 154(b) by 362 days.

(21) Appl. No.: 18/478,284

(22) Filed: Sep. 29, 2023

(65) Prior Publication Data

US 2024/0120989 A1    Apr. 11, 2024

Related U.S. Application Data

(60) Provisional application No. 63/378,591, filed on Oct. 6, 2022.

(51) Int. Cl.
| | |
|---|---|
| *H01Q 1/02* | (2006.01) |
| *H01Q 1/28* | (2006.01) |
| *H01Q 1/42* | (2006.01) |
| *H01Q 5/30* | (2015.01) |
(Continued)

(52) U.S. Cl.
CPC ........... *H04B 7/18508* (2013.01); *H01Q 1/28* (2013.01); *H01Q 5/30* (2015.01)

(58) Field of Classification Search
CPC ......... H04B 7/18508; H01Q 1/28; H01Q 5/30
See application file for complete search history.

(56) References Cited

U.S. PATENT DOCUMENTS

| | | | |
|---|---|---|---|
| 7,295,165 B2 | 11/2007 | Ferguson et al. | |
| 2017/0117625 A1* | 4/2017 | Mohoric | ................. H01Q 1/28 |
| 2017/0229765 A1* | 8/2017 | Vaddiparty | ........ H04B 7/18515 |
(Continued)

FOREIGN PATENT DOCUMENTS

| | | | |
|---|---|---|---|
| EP | 3796572 A1 | 3/2021 | |
| WO | WO-2017204881 A2 * | 11/2017 | ............ H04W 40/20 |

OTHER PUBLICATIONS

Arinc Characteristics 792 (Year: 2018).*
(Continued)

*Primary Examiner* — Wesley L Kim
*Assistant Examiner* — Fabian Botello
(74) *Attorney, Agent, or Firm* — Yee & Associates, P.C.

(57) ABSTRACT

An aircraft satellite communications system that communicates using satellite frequency bands. The aircraft satellite communications system comprises a base structure, transmitters, and receivers. The base structure has connectors arranged to correspond to connection points on an aircraft. The transmitters are connected to the base structure. The transmitters are configured to transmit using a first plurality of the satellite frequency bands. The receivers are connected to the base structure. The receivers are configured to receive using a second plurality of the satellite frequency bands. A selected transmitter in the transmitters transmits using a satellite frequency band in the satellite frequency bands is positioned at a distance from a selected receiver in the receivers using the satellite frequency band in the satellite frequency bands on the base structure with a number of other transmitters and receivers located between the selected transmitter and the selected receiver on the base structure.

21 Claims, 7 Drawing Sheets

(51) Int. Cl.
  H01Q 5/40 (2015.01)
  H04B 7/185 (2006.01)

(56) References Cited

U.S. PATENT DOCUMENTS

| 2019/0097299 | A1* | 3/2019 | Fotheringham | .......... H01Q 1/24 |
| 2021/0274567 | A1* | 9/2021 | Takeda | .................. H04W 76/11 |
| 2022/0094431 | A1* | 3/2022 | Kaen | ......................... H04B 7/19 |
| 2022/0200693 | A1* | 6/2022 | Karlsson | ............ H04B 7/18506 |

OTHER PUBLICATIONS

Axford, et al., "An Assessment of Multi-function Phased Array Antennas for Modern Military Platforms," IEEE International Symposium on Phased Array Systems and Technology, 2003., pp. 365-370, IEEE Xplore, accessed Sep. 18, 2023, doi: 10.1109/PAST.2003.1257009.

IEEE—SA Standards Board, "IEEE Standard Letter Designations for Radar-Frequency Bands—Redline," IEEE Std 521-2019 (Revision of IEEE Std 521-2002)—Redline , Feb. 14, 2020, pp. 1-22, No., pp. 1-22, IEEE Xplore, accessed Sep. 18, 2023, https://ieeexplore.ieee.org/document/9027205.

Anonymous: "Norm Arinc 792: 2018, Second-Generation Ku-Band and Ka-Band Satellite Communication System", Norm Arinc, Arinc, US, pp. 1-133, Dec. 1, 2018 (Dec. 1, 2018), XP009549895, Retrieved from the Internet: URL:https://global.ihs.com/doc_detail.cfm?item_s_key=00775285&item_key_date=901015&rid=GS.

European Patent Office Extended Search Report, dated Jul. 19, 2024, regarding Application No. EP 24155780.0, 8 pages.

* cited by examiner

702 — SPECIFICATION AND DESIGN

704 — MATERIAL PROCUREMENT

706 — COMPONENT AND SUBASSEMBLY MANUFACTURING

708 — SYSTEM INTEGRATION

710 — CERTIFICATION AND DELIVERY

712 — IN SERVICE

714 — MAINTENANCE AND SERVICE

800

AIRCRAFT

802 — AIRFRAME

806 — INTERIOR

SYSTEMS

808 — PROPULSION SYSTEM    812

810 — ELECTRICAL SYSTEM    814

HYDRAULIC SYSTEM

ENVIRONMENTAL SYSTEM

804

PHASED ARRAY ANTENNA SYSTEM 815

AIRBORNE SATELLITE CONNECTIVITY SYSTEM

CROSS-REFERENCE TO RELATED APPLICATION

This application claims the benefit of U.S. Provisional Patent Application Ser. No. 63/378,591, filed Oct. 6, 2022, entitled "Airborne Satellite Connectivity System," which is incorporated herein by reference in its entirety.

BACKGROUND INFORMATION

1. Field

The present disclosure relates generally to aircraft and in particular, to a satellite communications system for an aircraft.

2. Background

Satellite systems are used in aircraft to provide communications. The satellite data communications systems used in aircraft operate at different frequencies. For example, a Ku-band satellite system can operate at radio frequencies from 12 GHz to 18 GHz. A Ka-band satellite system can operate at radio frequencies from 26.5 GHz-40 GHz.

These types of satellite antenna systems can be used for various types of communication for the aircraft. For example, a satellite system can be used to provide in-flight connectivity. This connectivity can be used for exchanging information used to operate the aircraft. Further, this connectivity can also be used for in-flight entertainment, voice calls, internet connections, or data communications for passengers on the passenger aircraft.

The reception and transmission of electromagnetic signals by phased array satellite antenna(s) is referred to as a beam. Through the use of phase-shifters or time-delays to individual phased array antenna elements, phased array antennas can be made to point these beams in a particular direction for either transmitting or receiving signals. Beams can define the coverage on the earth's surface where a satellite can provide communications services. Beams are also used to point to satellites from ground stations, mobile vehicles, or airplanes for transmitting and receiving.

Current satellite phased array antenna systems for aircraft are located under radio frequency transparent radomes that house antennas with single beam Ku-band and Ka-band connectivity to satellites. With growing numbers of satellites being deployed in different orbits, at different velocities, at different distances from the earth, and at different frequency bands and polarizations, these current types of systems are inefficient for multiple transmit and receive beams to multiple satellites. Therefore, it would be desirable to have a method and apparatus that take into account at least some of the issues discussed above, as well as other possible issues. For example, it would be desirable to have a method and apparatus that overcomes limited connectivity and improves efficiency and cost when communicating with one or more satellite systems.

SUMMARY

An embodiment of the present disclosure provides an aircraft satellite communications system that communicates using satellite frequency bands. The aircraft satellite communications system comprises a base structure, transmitters, and receivers. The base structure has connectors arranged to correspond to connection points on an aircraft. The transmitters are connected to the base structure. The transmitters are configured to transmit using a first plurality of the satellite frequency bands. The receivers are connected to the base structure. The receivers are configured to receive using a second plurality of the satellite frequency bands. A selected transmitter in the transmitters transmits using a satellite frequency band in the satellite frequency bands is positioned at a distance from a selected receiver in the receivers using the satellite frequency band in the satellite frequency bands on the base structure with a number of other transmitters and receivers located between the selected transmitter and the selected receiver on the base structure.

Another embodiment of the present disclosure provides an aircraft satellite communications system comprising a base structure having connectors arranged to correspond to connection points on an aircraft. A Ku-band transmitter is connected to the base structure. The Ku-band transmitter transmits using a Ku-band satellite band. A Ka-band transmitter is connected to the base structure. The Ka-band transmitter transmits using a Ka-band satellite band. A Ku-band receiver is connected to the base structure. The Ku-band receiver receives using the Ku-band satellite band. A K-band receiver is connected to the base structure. The K-band receiver receives using a K-band satellite band.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a top view of an aircraft satellite communications system depicted in accordance with an illustrative embodiment;

DETAILED DESCRIPTION

Figure 1:
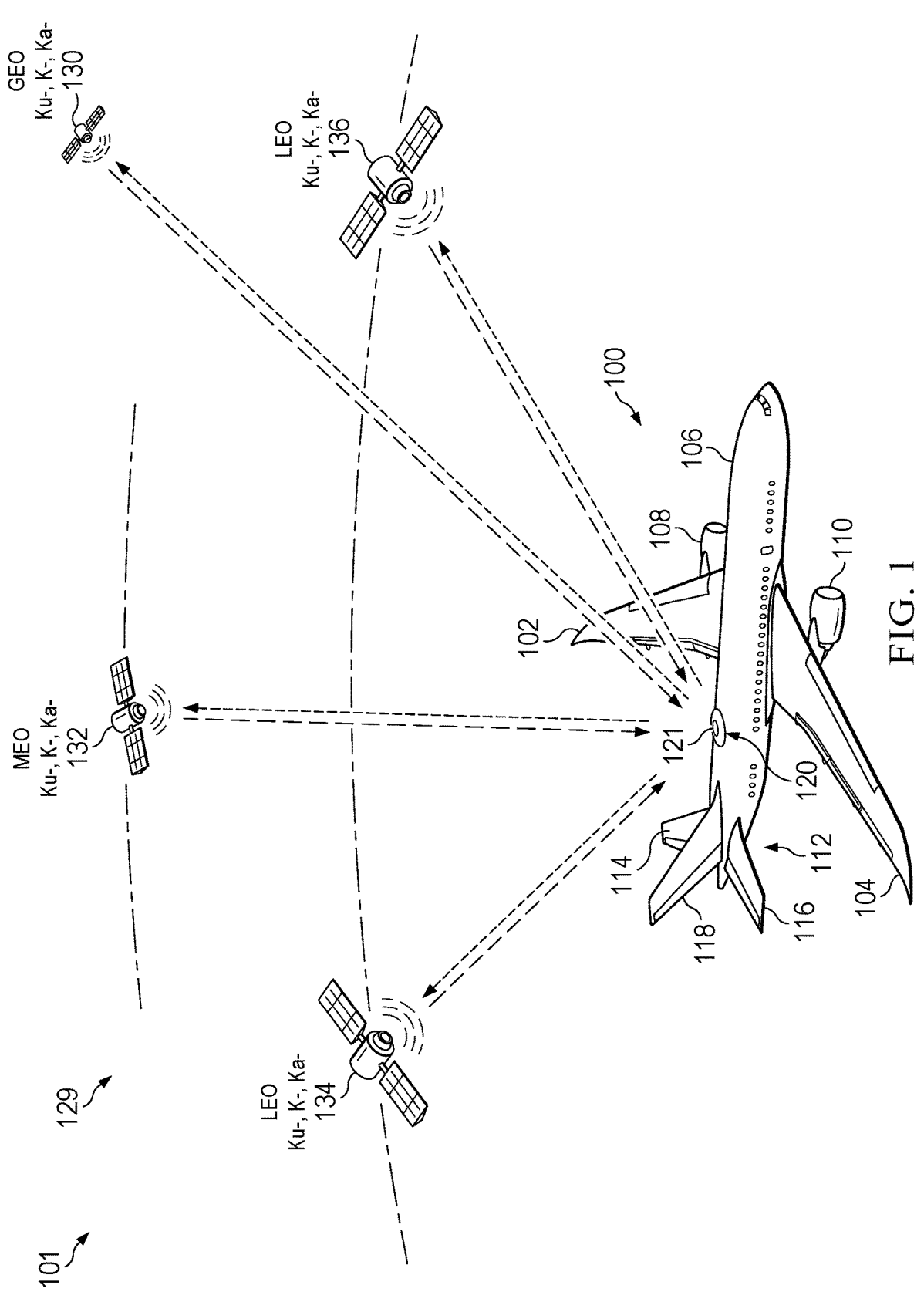
FIG. 1 is a pictorial illustration of an aircraft in communication with satellites in accordance with an illustrative embodiment.

The illustrative embodiments recognize and take into account one or more different considerations. For example, the illustrative embodiments recognize and take into account that existing configurations of satellite phased array antennas are directed towards providing single band communications. For example, a satellite phased array antenna system for an aircraft can comprise a Ka-band transmitter and a Ka-band receiver. Another satellite phased array antenna system can comprise a Ku-band transmitter and a Ku-band receiver. These satellite antenna systems are in packages that are certified for connection to particular aircraft. In other words, these antenna systems are in flight certified packages for particular aircraft.

The illustrative embodiments recognize and take into account that current satellite antenna systems do not provide multiband capabilities. For example, a current satellite antenna system may only provide an ability to use the Ku-band or the Ka-band but not in the same satellite antenna system that has been certified for use on aircraft.

Different communications providers of satellite communications can compete for business from airlines. These different communications providers may provide competitive quotes. However, the ability of an airline to use a particular provider can depend on the satellite band used by that provider.

Different communications providers of satellite communications can use different satellite transmission frequencies. For example, a first provider may use the Ku-band while a second provider may use the Ka-band to provide Internet service. As a result, if the aircraft for an airline uses a satellite antenna system operating on the Ka-band and the provider offering the best proposal provides service using the Ku-band, then the airline is unable to take advantage of this proposal without changing the satellite antenna systems on their aircraft. This type of change can be costly and time-consuming. As a result, an airline can be limited in the service providers that they can use.

A way of addressing this problem is the use of a single multi-band (Ku- to Ka-band), multi-function (Tx and Rx) wide-beam scanning phased-array aperture. In the design of such an aperture, the radiator elements must operate over the entire bandwidth and fit within the tight-element spacing set by the upper frequency limit (31 GHz). The combined Tx (Ku- and Ka-band) and Rx (Ku- and K-band) functions require the use of wideband, high-power, low-loss circulators or switches that must fit within the available element area along with phase-shifters, low-noise amplifiers, high-power amplifiers, controllers, filters, and matching circuitry at each unit-cell. Each unit-cell is replicated over the entire aperture. If circulators and filters are not physically realizable at each unit cell to achieve the required Tx to Rx isolation for simultaneous full-duplex operation, then a switch relegates this solution to half-duplex operation and significantly reduces the available system data through-put. This approach also strains the bandwidth of each element within very tight-array lattices.

Another approach provides two antennas, one for transmit and one for receive, as multi-band, single-function wide-beam scanning phased array apertures. The transmit aperture operates at (Ku- and Ka-band) while the receive aperture operates at (Ku- and K-band). No circulators or switches are required and full-duplex operation may be achieved using spatial separation and/or ground plane corrugations to increase transmit to receive isolation. The Tx aperture radiator elements must operate over the entire (Ku- to Ka-band) bandwidth and fit within the tight element spacing set by the upper frequency limit. (31 GHz) The Tx unit cell includes high-power amplifiers, phase-shifters, controllers and matching circuits at each unit-cell which are replicated over the entire aperture. Similarly, the Rx aperture radiator elements must operate over the entire (Ku- to K-band) bandwidth and fit within the tight element spacing set by the upper frequency limit (21.2 GHz) The Rx unit cell includes low-noise amplifiers, phase-shifters, controllers and matching circuits at each unit-cell which are replicated over the entire aperture. In this approach, elements operate over large bandwidths within tight-array lattices which often increases complexity and degrades performance.

Here, the illustrative embodiments provide an antenna system that provides multi-satellite band capabilities without degraded performance or reduced radiator efficiency. Further, these capabilities are provided and sized to fit within the dimensions of the ARINC-792 industry standard. This example uses 4 single-band, single-function wide-beam scanning phased array apertures. For the Ka-band Tx, the radiator elements operate at (27 to 31 GHz) with element spacing set at (31 GHz). The Ku-band Tx radiator elements operate from (14 to 14.5 GHz) with the element spacing set at (14.5 GHz). The Ku-Tx unit cell also provides arbitrary-linear polarization operation to accommodate the existing satellite constellation. The Ka-Tx aperture provides switchable Right-hand circular and left-hand circular operation. Each Tx aperture includes high-power amplifiers and phase-shifters optimized at their appropriate band over the entire scanning volume.

With reference now to the figures, and in particular, with reference to FIG. 1, a pictorial illustration of an aircraft in communication with satellites is depicted in accordance with an illustrative embodiment. In this illustrative example, aircraft 100 in communications environment 101 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which aircraft satellite communications system 120 can be implemented in accordance with an illustrative embodiment. As depicted, aircraft satellite communications system 120 includes phased array antennas 121 on body 106 of aircraft 100.

Aircraft satellite communications system 120 can be used to communicate with satellites 129. In this example, satellites 129 includes geosynchronous orbit (GEO) satellite 130, medium earth orbit (MEO) satellite 132, low earth orbit (LEO) satellite 134, and LEO satellite 136. In this example, different satellites can be in different orbits at different altitudes.

For example, GEO satellite 130 travels in a geostationary orbit. The altitude of this satellite is about 35,786 kilometers above the Earth's equator. In this example, GEO satellite 130 travels at the same rate as the Earth's rotation and orbits the earth in about 24 hours. With this orbit, GEO satellite 130 appears to be stationary relative to a fixed point on the ground. A delay of 270 mS is present for communications exchanged with GEO satellite 130. For example, GEO satellite 130 can be used for television broadcasts and Internet communications, as well as other types of communications. Depending upon the service provider, GEO satellite 130 may transmit or receive at Ku, K, or Ka frequency bands.

As depicted, MEO satellite 132 travels in a medium earth orbit (MEO). Altitudes of MEO satellite 132 can range from 2000 km to just below 35,780 kilometers. Since MEO satellite 132 is closer to earth, it travels at a speed faster than GEO satellite 130. This type of satellite can orbit the earth in about 127 minutes when the orbit is at an altitude of about 2000 km. At this altitude, the delay of 15 ms is present for communications. Depending upon the service provider, MEO satellite 132 may transmit or receive at Ku, K, or Ka frequency bands.

In this example, LEO satellite 134 and LEO satellite 136 travel in a low Earth orbit (LEO). The satellites travel at an altitude that is typically below 2000 km. For example, these two satellites can travel at an altitude of 160 km. The satellites can orbit the earth in about 88 minutes when the satellite is at an altitude of 160 km. At this altitude, a delay of 1.2 milliseconds is present. Depending upon the service provider, LEO satellite 134 and LEO satellite 136 may transmit or receive at Ku, K, or Ka frequency bands.

These satellites are at different distances from the earth and from aircraft satellite communications system 120. As result, different signal levels are needed to communicate with different satellites. For example, GEO satellite 130 orbits at 35,786 km. Because of this distance, the GEO satellite requires the most sensitive receivers on aircraft satellite communications system 120, and the most power for the transmitters compared to communications with the other satellites.

In this example, MEO satellite 132 orbits at 2000 km. MEO satellite 132 is 17 times closer than GEO satellite 130 and requires less sensitivity for the aircraft satellite communications system 120 receivers and less power for transmitters. Further, LEO satellite 134 and LEO satellite 136 are at 160 km and are 12.5 times closer than MEO satellite 132. As a result, these satellites require reduced sensitivity for aircraft satellite communications system receivers in aircraft satellite communications system 120 and less power for the aircraft satellite communications system transmitters in aircraft satellite communications system 120.

In addition, these satellites also operate at different transmit and receive frequencies. In one example, transmit (Tx) uplink to GEO satellite 130 uses Ka-band. The receive (Rx) downlink from GEO satellite 130 uses Ku-band. Further in this example, the transmit (Tx) uplink to MEO satellite 132 is a Ku-band, the receive (Rx) downlink from MEO satellite 132 is K-band. The LEO satellites use a transmit (Tx) uplink that is a K-band or Ka-band. In this example, the receive (Rx) downlink for LEO satellites is a Ku-band.

A number of parameters are used to measure and determine communications with satellites. These parameters include effective isotropic radiated power (EIRP) and antenna gain/noise temperature (G/T) ratio. In this example, EIRP represents the strength of the transmitted signal from an antenna. This parameter indicates how much power an isotropic (uniformly radiating) antenna needs to emit to produce the same peak power density as the actual antenna in its direction of maximum gain. This parameter effectively quantifies the signal strength as it leaves the transmitting phased array antenna.

In this example, G/T is a measure of a satellite system's receiving capability. In this ratio, "G" is the antenna gain. This antenna gain indicates the effectiveness of the antenna in capturing incoming signals. Further in this example, "T" is the system's noise temperature. T is a measure of its internal and external noise. As the G/T ratio increases, the receiver can better discern weak signals amidst the background noise.

In these examples, assuming similar satellite antennas, more EIRP and G/T is needed to connect to GEO satellite 130 as compared to MEO satellite 132, LEO satellite 134, or LEO satellite 136. In these illustrative examples, an ability to subdivide an aperture for receiver or transmitter into multiple apertures in aircraft satellite communications system 120 enables having increased numbers of connections from the aircraft to the satellites.

In this illustrative example, aircraft satellite communications system 120 has multiband capabilities. For example, aircraft satellite communications system 120 can support communications using K-, Ka- and Ku-bands. This phased array antenna system is in contrast to current antenna systems which only support a single satellite band. In the illustrative examples, the phased array antenna system can support multiple satellite bands without needing recertification for use with an aircraft. In this illustrative example, the package for the phased array antenna system can fit under the currently used radome and can be connected to the aircraft using the same connection points on the aircraft.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of items" is one or more items.

Thus, aircraft 100 with aircraft satellite communications system 120 can use multiple satellite bands for communications. As a result, increased flexibility in selecting communications providers occurs using this phased array satellite system.

Figure 2:
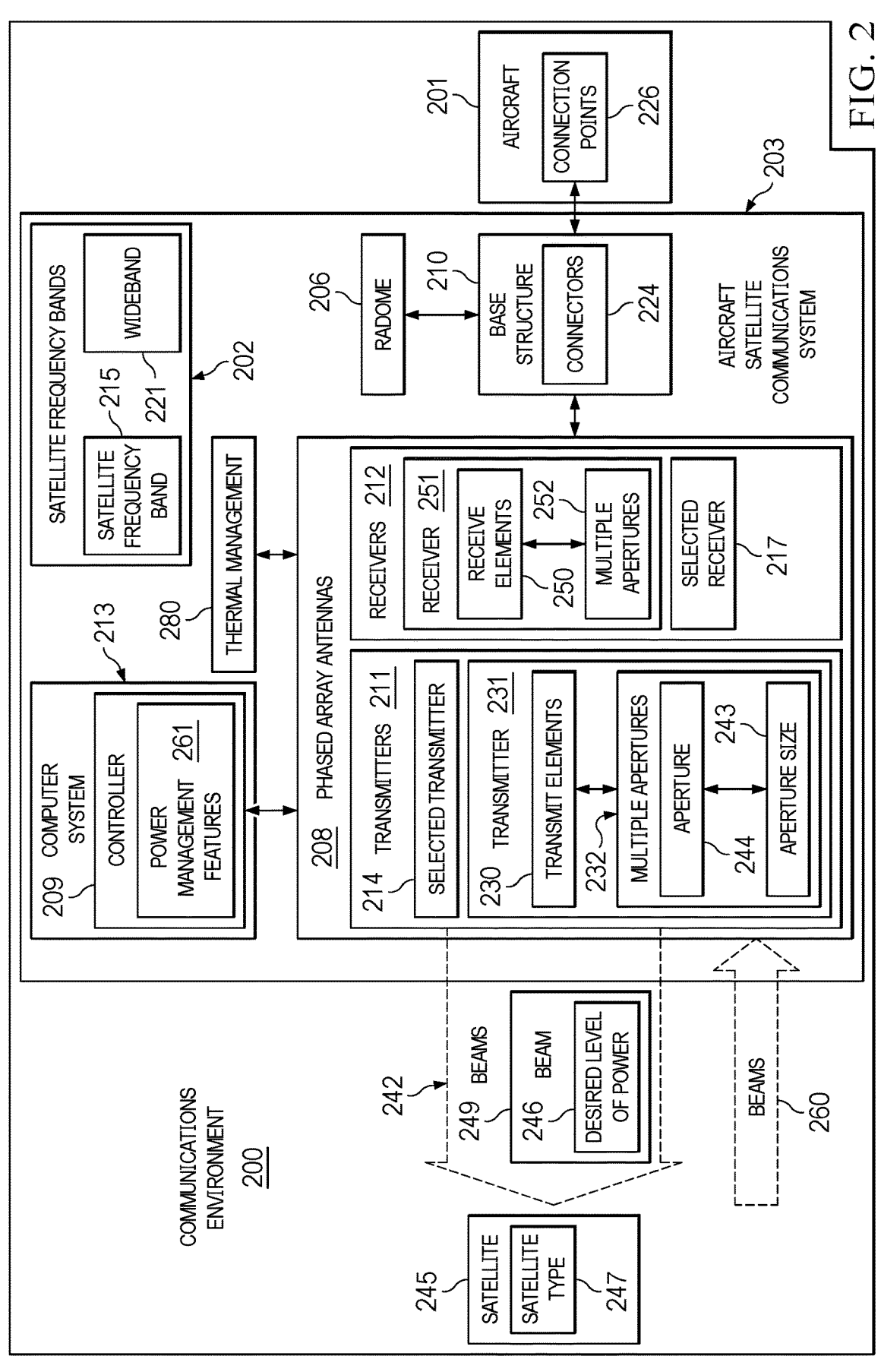
FIG. 2 is an illustration of a block diagram of a communications environment in accordance with an illustrative embodiment.

With reference now to FIG. 2, an illustration of a communications environment is depicted in accordance with an illustrative embodiment. In this illustrative example, communications environment 200 is an environment in which satellite communications can be provided to aircraft 201. In this example, communications environment 101 in FIG. 1 is an example of an implementation for communications environment 200 in FIG. 2. Aircraft satellite communication system 203 communicates from aircraft 201 to satellites 245 using satellite frequency bands 202. In this example, satellite frequency bands 202 form wideband 221.

Aircraft 201 can take a number different forms. For example, aircraft 201 can be selected from a group comprising a commercial airplane, a cargo airplane, a tilt-rotor aircraft, a tilt wing aircraft, a military vehicle, a vertical takeoff and landing aircraft, an unmanned aerial vehicle, a drone, an electric vertical takeoff and landing vehicle, a personal air vehicle, and other types of aircraft, land vehicles, or water-based vessels.

In this example, aircraft satellite communications system 203 comprises a number of different components. As depicted, aircraft satellite communications system 203 comprises base structure 210, phased array antennas 208, controller 209, and radome 206

Base structure 210 is a physical component that serves as a platform or structure on which phased array antennas 208 can be connected. Base structure 210 has connectors 224 arranged to correspond to connection points 226 on aircraft 201.

When one component is "connected" to another component, the connection is a physical connection. For example, a first component, a phased array antenna, can be considered to be physically connected to a second component, base structure 210, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both. In some examples, the first component can be physically connected to the second component by being located within the second component.

In this illustrative example, phased array antennas 208 comprise transmitters 211 and receivers 212. In this illustrative example, transmitters 211 and receivers 212 include phase array apertures that are comprised of elements that operate to transmit or receive beams. These elements can also be referred to as antenna elements.

In this example, transmitters 211 are connected to the base structure 210. Transmitters 211 transmit using a first plurality of satellite frequency bands 202. Receivers 212 also are connected to base structure 210. In this example, receivers 212 receive using a second plurality of satellite frequency bands 202.

A transmitter in transmitters 211 is a hardware component that comprises elements and electronics that are used to transmit beams 242. These elements include antenna elements that are used to transmit a beam. A receiver in receivers 212 is a hardware component that comprises elements and electronics that are used to receive a beam. These elements also include antenna elements and are used to receive a beam. The electronics in these examples can include amplifiers, filters, phase shifters, time delays, distribution networks, and other components used to operate the elements.

In these illustrative examples, a satellite frequency band 215 is a specific range of radio frequencies used for satellite communication. Examples of satellite frequency bands 202 include L-, S-, C-, X-, Ku-, K-, Ka-, Q-, V-bands. A satellite using a satellite frequency band can transmit or receive using a frequency within that satellite frequency band.

As depicted, radome 206 is a structural enclosure that protects components. In this example, radome 206 covers transmitters 211 and receivers 212 connected to base structure 210. Radome 206 physically shields transmitters 211 and receivers 212 from the environment around aircraft 201 without interfering with the operation of these antennas. Radome 206 can function to protect these antennas from airflow around the aircraft, adverse weather conditions, temperature extremes, impacts, or other undesired contact while enabling communication signals to pass through the radome 206 in both directions.

In this illustrative example, selected transmitter 214 in transmitters 211 transmits using satellite frequency band 215 in the satellite frequency bands 202 and is positioned at a distance from selected receiver 217 in the receivers 212 using satellite frequency band 215 in satellite frequency bands 202 on base structure 210 with a number of other transmitters and receivers located between selected transmitter 214 and selected receiver 217 on base structure 210. These transmitters and receivers comprise phased array antennas having antenna elements, phase shifters or time delays, distribution networks, and electronics.

In one illustrative example, the distance is a maximum physical distance possible between selected transmitter 214 and selected receiver 217. In other words, to improve radio frequency isolation and reduce interference, the greatest distance possible between these two components is used with respect to the placement of other transmitters and receivers on base structure 210.

In one illustrative example, selected transmitter 214 is a Ku-band transmitter and selected receiver 217 is a Ku-band receiver. In this example, the receive frequency is a part of a Ku-band from 10.7 GHz to 12.7 GHz and the transmit frequency is a part of the Ku-band from 14 GHz to 14.5 GHz.

With this example, the positioning of these two components is such that the Ku-band transmitter and the Ku-band receiver are located on opposite ends of the base structure 210. This positioning provides the distance in the form of a maximum physical distance in this example.

In another illustrative example, selected transmitter 214 is a Ka-band transmitter and selected receiver 217 is a K-band receiver. In this example, the transmit frequency is a part of a Ka-band from 27.5 to 31 GHz. The receive frequency is a part of a K-band from 17.7 GHz to 21.2 GHz. In this example, the Ka-band transmitter and the K-band receiver are located on opposite ends of base structure 210.

In other illustrative examples, the distance does not necessarily need to be a maximum physical distance. Instead, this distance can be selected as a value that reduces or avoids interference between selected transmitter 214 and selected receiver 217 when components are operating at the same time.

In this illustrative example, transmitters 211 and receivers 212 are positioned such that interference between transmitters 211 and receivers 212 is reduced. Selection of positions can depend on satellite frequency bands 202 used by the different components and based on when components may operate at the same time. For example, if a transmitter and a receiver both operate using the same satellite frequency band and can operate at the same time, position can be selected to reduce interference between the transmitter and receiver.

In these examples, transmitters 211 can further comprise a transmitter that transmits using a Ka-band. In this example, receivers 212 can further comprise a receiver that receives using the K-band. With this example, the Ku-band transmitter and the Ku-band receiver are located on opposite ends of the base structure and wherein the Ka-band transmitter and the K-band receiver are located between the Ku-band transmitter and the Ku-band receiver.

The positioning of receivers and transmitters can also be selected to provide the greatest separation between a transmitter and a receiver using the same satellite bands. This positioning of receivers and transmitters can also be selected to provide the greatest separation between a transmitter and a receiver using different satellite bands. By increasing the physical separation between different components that operate using frequencies that are closer than the frequencies used by other components, interference can be reduced in aircraft satellite communications system 203.

In one illustrative example, two transmitters and two receivers are used in aircraft satellite communications system 203. In this example, the base structure 210 with the two transmitters and the two receivers is a standard, such as ARINC 792. In other words, these components are designed and placed such that the standards requirements of ARINC 792 are met. ARINC 792 is a standard that sets out the desired characteristics of a second-generation aviation Ku-band and Ka-band satellite communication (satcom) system intended for installation in all types of aircraft.

In this illustrative example, controller 209 controls the operation of phased array antennas 208. In these illustrative examples, controller 209 can be implemented in software, hardware, firmware or a combination thereof. When software is used, the operations performed by controller 209 can be implemented in program instructions configured to run on hardware, such as a processor unit. When firmware is used, the operations performed by controller 209 can be implemented in program instructions and data and stored in persistent memory to run on a processor unit. When hardware is employed, the hardware can include circuits that operate to perform the operations in controller 209.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this example, controller 209 can be located in computer system 213, which is a physical hardware system and includes one or more data processing systems. When more than one data processing system is present in computer system 213, those data processing systems are in communication with each other using a communications medium. The communications medium can be a network. The data processing systems can be selected from at least one of a computer, a server computer, a tablet computer, or some other suitable data processing system.

As depicted, computer system 213 includes a number of processor units that are capable of executing program instructions implementing processes in the illustrative examples. In other words, program instructions are computer-readable program instructions.

Controller 209 can control transmitters 211 to transmit information and control receivers 212 to receive information. Further in this example, the control of phased array antennas 208 performed by controller 209 can include controlling when and how phased array antennas 208 receive and transmit satellite signals. Further, controller 209 can operate to reduce interference from the operation of transmitters in phased array antennas 208. For example, controller 209 can include hardware to reduce cosine interference and other interference that can occur from multiple transmitters operating at the same time. In other illustrative examples, controller 209 can reduce this interference by controlling the operation of phased array antennas 208 such that a single transmitter transmits at any particular time.

In some illustrative examples, interference can also be reduced through the use of structural components. For example, corrugation grooves that are configured to provide a desired amount of attenuation between a receiver and transmitter can be implemented. These grooves can be implemented in a structure located between the receiver and the transmitter such that attenuation of the radio frequencies occurs at the receiver while the transmitter is transmitting the radio frequencies. Interference can also be reduced using meta materials or other absorptive materials. These meta materials are resonant at the frequency of interest to suppress the flow currents at that frequency that can cause interference. This use of at least one of the grooves, meta materials, or other absorptive or suppressive materials attenuates the signals from the transmitter that flow to the receiver and increases transmitter to receiver isolation. As result, interference is reduced using these and other techniques.

Controller 209 can also include power management features 261. For example, controller 209 can selectively power different antennas and phased array antennas 308 in FIG. 3 based on power usage of those phased array antennas.

Returning to FIG. 2, in one illustrative example, controller 209 can subdivide transmit elements 230 in transmitter 231 in transmitters 211 into multiple apertures 232. Transmit elements 230 can be grouped into regions such that multiple apertures 232 are present. These groups of transmit elements 230 can be controlled independently to transmit signals in the form of beams. In this example, transmit elements 230 are antenna elements used to transmit signals such as those that form a beam.

Controller 209 can then transmit information from transmitter 231 in a number of beams 242 using a number of multiple apertures 232.

In this illustrative example, an aperture represents a region of antenna elements that work together to transmit or receive electromagnetic waves. These individual antenna elements can have their phase adjusted electronically, allowing the entire array to steer the direction of the main beam without physically moving the antenna. The manipulation of phase or time among the antenna elements allows the phased array to control the way its aperture interacts with electromagnetic waves, thereby determining the direction and shape of the transmitted or received signals or beams. An aperture can be subdivided into multiple apertures 232 such that the different antenna elements in the different apertures work together to form different beams.

Further in this example, controller 209 selects aperture size 243 for aperture 244 that enables using the amplifiers for transmit elements 230 in aperture 244 at a power level that controls the amplifiers for transmit elements 230 in aperture 244 to emit beam 249 in the number of beams 242 toward satellite 245 with the desired level of power 246 for satellite type 247 of satellite 245.

In this example, satellite type 247 can be, for example, a GEO satellite, a MEO satellite, or a LEO satellite. These different types of satellites orbit at different distances from the earth and thus require different transmit powers. For example, a GEO satellite may require maximum transmitter amplifier saturation to effectively and efficiently reach the GEO satellite. However, for transmitting to a LEO satellite, using too much power can result in beam 249 in the number of beams 242 to transmit with power that may over-saturate the input stage of the receiving satellite 245. Thus, controller 209 must control the desired level of power 246 for maximum efficiency in effectively transmitting to each satellite type 247 of satellite 245.

In this example, rather than reducing the power to all of the amplifiers in a transmitter to a LEO satellite, the transmitter can be divided into multiple apertures 232. Aperture 244 in multiple apertures 232 can transmit the information in a beam 249 in beams 242 in which the subset of amplifiers are used to transmit to a LEO satellite at full power and operating in a saturation mode for maximum efficiency. This provides for the greater efficiency in energy use in transmitting information to different types of satellites at different distances from the aircraft.

In another illustrative example, controller 209 can subdivide receive elements 250 in receiver 251 of receivers 212 into multiple apertures 252. Receive elements 250 are antenna elements that operate to receive signals. In this example, controller 209 can receive information from a number of beams 260 using a number of multiple apertures 252.

In these examples, more EIRP and G/T is needed to connect to a GEO satellite as compared to a MEO satellite or a LEO satellite. With less EIRP and G/T, subdividing an aperture into multiple apertures for a receiver or a transmitter in phased array antennas 208 enables having an increased number of beams resulting in connections from the aircraft to the satellites. In these examples, each additional aperture enables using an additional beam to receiver transmit information.

Further, aircraft satellite communications system 203 can also include thermal management 280. Thermal management 280 includes features or components that are selected to reduce thermal issues that can occur from using multiple ones of transmitters 211 and receivers 212 in phased array antennas 208. Thermal management 280 can include at least one of transmitter placement on base structure 210, receiver placement on base structure 210, a thermal conductor structure, a heat transfer fin, an air flow structure, a fan, a heat transfer unit, an insulator, or other suitable features that can draw off heat generated by transmitters 211. These thermal management features can be selected to perform heat transfer or increasing convection such that heat generation by transmitters 211 do not affect the performance or operation of the transmitters.

For example, the phased array antennas for transmitters and receivers can include metallic cold-plates to remove heat from electronics and spread the heat away from these components. Further, thermal management 280 can also include mechanisms such as passive and active heat spreaders. These heat spreaders can include heat-pipes, liquid cooling, fins, and other suitable components.

Figure 3:
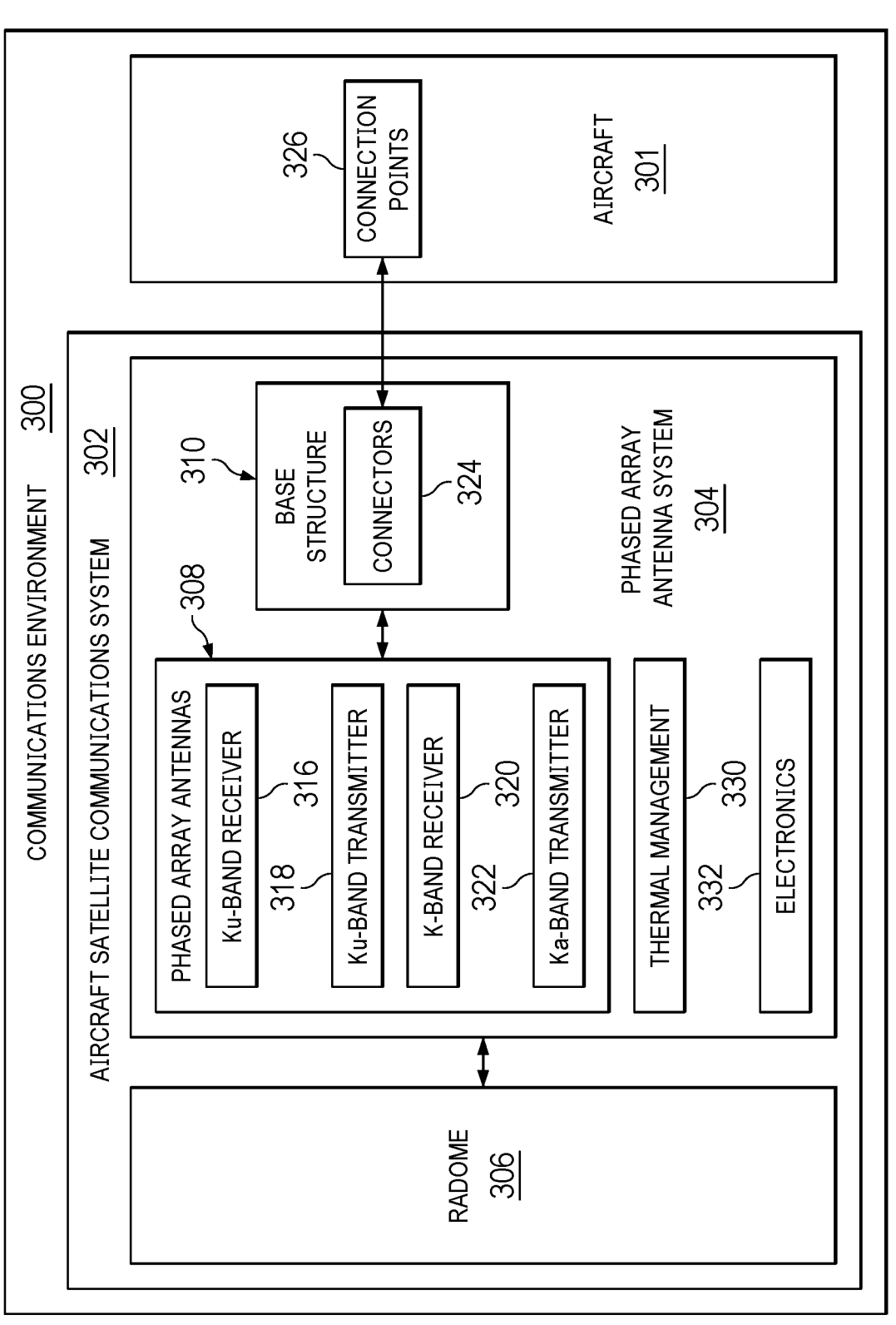
FIG. 3 is an illustration of a phased array antenna system on an aircraft in accordance with an illustrative embodiment.

With reference to FIG. 3, an illustration of a communications environment is depicted in accordance with an illustrative embodiment. In this illustrative example, communications environment 300 is an environment in which satellite communications can be provided to aircraft 301 using aircraft satellite communications system 302. In this example, communications environment 101 in FIG. 1 is an example of an implementation for communications environment 300. Aircraft satellite communications system 302 communicates with aircraft 301 using connectors 324 and connection points 326. In this illustrative example, aircraft satellite communications system 302 includes phased array antenna system 304 and radome 306.

In this illustrative example, phased array antenna system 304 comprises phased array antennas 308 and base structure 310. In this example, phased array antennas 308 can be used instead of mechanical satellite antennas that rotate or move. These phased array antennas can take up less space as compared to mechanical satellite antennas. In this illustrative example, phased array antennas 308 comprises Ku-band receiver 316, Ku-band transmitter 318, K-band receiver 320 and Ka-band transmitter 322.

As depicted, phased array antennas 308 are connected to base structure 310. Base structure 310 is a structure that supports the different components in aircraft satellite communications system 302. In this illustrative example, base structure 310 has connectors 324 that connect to connection points 326 on aircraft 301. In this illustrative example, connectors 324 are configured such that changes to connection points 326 are not needed. In other words, base structure 310 can be connected to aircraft 301 using existing connection points.

In this illustrative example, aircraft satellite communications system 302 fits inside of radome 306, which is an enclosure that protects phased array antenna system 304 and is constructed of a material that is transparent to radio frequency signals transmitted and received by phased array antenna system 304. As depicted, the selection of phased array antennas 308 is made such that the phased array antennas 308 and base structure 310 can fit under radome 306 without needing changes to radome 306.

In this illustrative example, aircraft satellite communications system 302 meets ARINC 792 standards. For example, base structure 310, Ku-band receiver 316, Ku-band transmitter 318, K-band receiver 320 and Ka-band transmitter 322 meet ARINC 792 standards. Additionally, connectors 324 have dimensions and arrangements corresponding to connection points 326 that meet ARINC 792 standards. In other examples, aircraft satellite communications system 302 can be designed and constructed to meet other standards or specifications.

In this illustrative example, phased array antenna system 304 also includes thermal management 330. Thermal management 330 includes features or components that are selected to reduce thermal issues that can occur from using multiple transmitters and receivers in phased array antenna system 304. Thermal management 330 can include at least one of transmitter placement on base structure 310, receiver placement on base structure 310, a thermal conductor structure, one or more heat transfer fins, an air flow structure, a fan, a heat transfer unit, an insulator, or other suitable features that can draw off heat generated by transmitters.

These thermal management features can be selected to perform heat transfer or convection such that heat generation by transmitters do not affect the performance or operation of the transmitters.

Additionally, phased array antenna system 304 can also include electronics 332. Electronics 332 control the operation of phased array antennas 308. Electronics 332 comprises hardware circuits and may include computers. Further, electronics 332 can include software that is used by the hardware.

The control of phased array antennas 308 can include controlling when and how phased array antennas 308 receive and transmit satellite signals. Further, electronics 332 reduce interference from the operation of transmitters in phased array antenna system 304. For example, electronics 332 can include hardware to reduce cosine interference and other interference that can occur from multiple transmitters operating at the same time.

In other illustrative examples, electronics 332 can reduce this interference by controlling the operation of phased array antennas 308 such that beam directionality is controlled or a single transmitter transmits at any particular time.

Electronics 332 can also include power management features. For example, electronics 332 can selectively power different antennas and phased array antennas 308 at different power levels based on power usage of those phased array antennas.

In the illustrative examples, phased array antenna system 304 can use multiple receivers and transmitters for multiple satellite bands in a package that has the same form factor as currently used satellite antenna systems for aircraft. Further, increased flexibility in communications can be obtained by having multiple types of transmitters. For example, a transmitter can be used based on the transmitter having the best quality for transmitting information. As another example, increased bandwidth can be obtained through using multiple transmitters and receivers at the same time. In yet another illustrative example, one transmitter and receiver can operate as a backup to the other transmitter and receiver.

In the illustrative examples, phased array antenna system 304 can use multiple receivers and transmitters for multiple satellite bands in a package that has the same form factor as currently used satellite antenna systems for aircraft. In yet another illustrative example, another set of Ku-band satellite antennas is used in addition to or in place of K-band receiver 320 or Ka-band transmitter 322. In yet another illustrative example, an additional set of satellite antennas can be used in addition to Ku-band receiver 316 and Ku-band transmitter 318, and Ka-band transmitter 322 and K-band receiver 320 depending on the space available.

With the ability to use multiple satellite bands, increased options are available to airlines using aircraft with this phased array antenna system. For example, an airline does not need to change the phased array antenna system on an aircraft based on whether the potential provider uses the Ku-band or Ka-band when the phased array antenna system includes transmitters and receivers for both bands. As a result, having a particular type of hardware is not a limiting factor in the different illustrative examples. Further, the ability to have multiple transmitters and receivers of the same type can increase the available bandwidth and provide communications redundancy.

Thus, one or more illustrative examples can provide improved connectivity for aircraft as compared to currently used satellite systems. In one or more illustrative examples, the aircraft satellite communications system has a design and configuration that enables receiving beams and transmitting beams with satellites that communicate with multiple service providers using different satellite bands. In the illustrative examples, the aircraft satellite communications system can simultaneously provide connectivity with multiple service providers using different satellite bands.

Further, the illustrative examples can be implemented in a manner that follows current standards for satellite communications for aircraft such as the ARINC 792 standard. This implementation can provide increased connectivity while meeting current standards for satellite communications for aircraft.

Thus, the illustrative examples provide an improved aircraft satellite communications system that communicates using satellite frequency bands. The satellite frequency bands can cover the desired bands needed to provide service to aircraft from multiple service providers. The aircraft satellite communications system comprises a base structure, transmitters, and receivers. The base structure has connectors arranged to correspond to connection points on an aircraft. The transmitters are connected to the base structure. The transmitters are configured to transmit using a first plurality of the satellite frequency bands. The receivers are connected to the base structure. The receivers are configured to receive using a second plurality of the satellite frequency bands. In one illustrative example, for improved signal isolation, a selected transmitter in the transmitters transmits using a satellite frequency band in the satellite frequency bands is positioned at a distance from a selected receiver in the receivers using the satellite frequency band in the satellite frequency bands on the base structure with a number of other transmitters and receivers located between the selected transmitter and the selected receiver on the base structure. In this illustrative example, these transmitters and receivers comprise phased array antennas having antenna elements, phase shifters or time delays, distribution networks, and electronics.

The illustration of communications environment 200 in FIG. 2 and communications environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, aircraft satellite communications system 302 can also include a power supply connected to base structure 310. In other examples, the power supply can be provided by aircraft 301 with connection points to phased array antenna system 304. In still another illustrative example, electronics 332 can be located in aircraft 301 instead of being connected to base structure 310. In yet other illustrative examples, electronics 332 can be distributed between phased array antenna system 304 and aircraft 301. For example, modems, control boards, and other hardware for different vendors for services can be located on aircraft 301 reducing the need to access phased array antennas 308 under radome 306.

Figure 4:
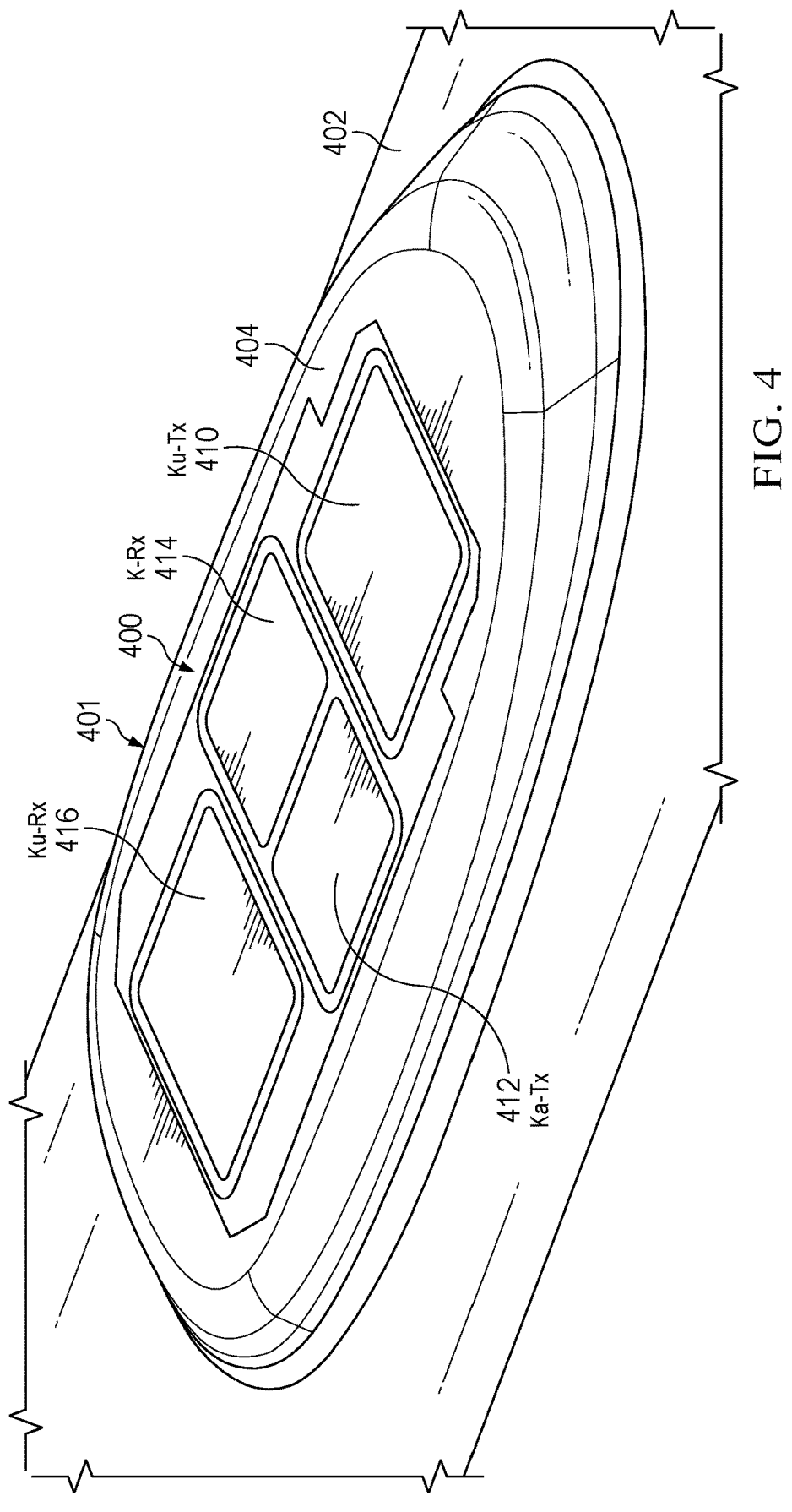
FIG. 4 is an illustration of a phased array antenna system on an aircraft depicted in accordance with an illustrative embodiment.

With reference to FIG. 4, an illustration of a phased array antenna system on an aircraft is depicted in accordance with an illustrative embodiment. As depicted, aircraft satellite communications system 401 is located on aircraft 402. Aircraft satellite communications system 401 is an example of an implementation for aircraft satellite communications system 203 in FIG. 2 and aircraft satellite communications system 302 in FIG. 3.

In this illustrative example, aircraft satellite communications system 401 takes the form of phased array antenna system 400 and is located within radome 404. In this illustrative example, an exposed view of radome 404 is depicted to illustrate the location of Ku-band transmitter (Tx) 410, Ka-band transmitter (Tx) 412, K-band receiver (Rx) 414 and Ku-band receiver (Rx) 416 within radome 404.

In this illustrative example, Ku-band transmitter (Tx) 410 is located opposite of Ku-band receiver (Rx) 416. In this example, Ka-band transmitter (Tx) 412 and K-band receiver (Rx) 414 are located between Ku-band transmitter (Tx) 410 and Ku-band receiver (Rx) 416. This positioning of receivers and transmitters provides the greatest separation between a transmitter and a receiver using the same satellite band. In this example, the satellite band is a Ku-band. This configuration reduces interference between the Ku-band transmitter (Tx) 410 and Ku-band receiver (Rx) 416. Displacement can provide the maximum possible distance between these two components.

This illustration of antennas for phased array antenna system 400 is provided as an illustrative example not meant to limit the manner in which antennas can be positioned in other illustrative examples. For example, Ku-band transmitter (Tx) 410 can be a Ka-band transmitter instead of a Ku-band transmitter, and Ka-band transmitter (Tx) 412 can be a Ku-band transmitter instead of a Ka-band transmitter. In yet another illustrative example, an additional transmitter, an additional receiver, or an additional transmitter and receiver can be part of phased array antenna system 400.

Further, other components are present but not shown in this example. A base structure, thermal management components, electronics, and other components associated with these antennas can be present although not depicted in this example.

Figure 5:
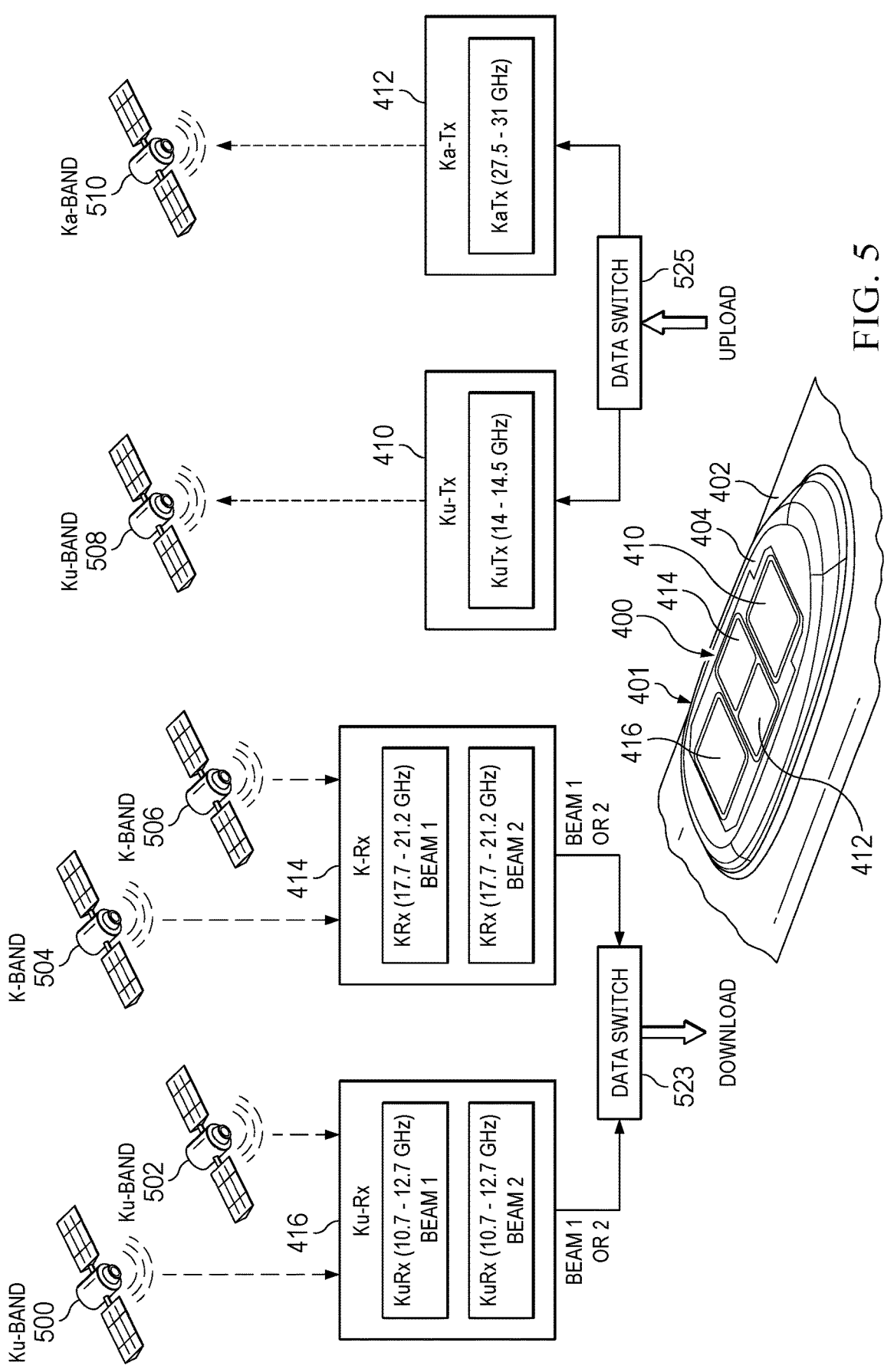
FIG. 5 is an illustration of a schematic diagram for satellite communications with an aircraft satellite communications system using satellites from two services depicted in accordance with an illustrative embodiment.

With reference next to FIG. 5, an illustration of a schematic diagram for satellite communications with an aircraft satellite communications system using satellites from two services is depicted in accordance with an illustrative embodiment. In the illustrative examples, the same reference numeral may be used in more than one figure. This reuse of a reference numeral in different figures represents the same element in the different figures.

In this example, satellite communications can be provided through the use of satellite services that provide communications including high-speed Internet to passengers and aircraft crew through aircraft satellite communications system 401 on aircraft 402. In this example, Ku-band transmitter (Tx) 410, Ka-band transmitter (Tx) 412, K-band receiver (Rx) 414 and Ku-band receiver (Rx) 416 under radome 404 can be used to receive information from more than one service. In this example, these components are seen in an exposed view of radome 404.

In this example, these different receivers and transmitters can receive information in beams from satellites operated by different services. Different services may use different satellite bands from other services. With the selection of receivers and transmitters to cover different satellite bands, the ability to transmit and receive information from more than one service is present.

In this illustrative example, Ku-band receiver (Rx) 416 can receive information from Ku-band satellite 500 and Ku-band satellite 502. Further, the receiver in the receivers can simultaneously receive multiple beams from different satellites. This receiver can receive information in one or two beams with a frequency from 10.7 GHz to 12.7 GHz. For example, Ku-band receiver (Rx) 416 can receive information from beam 1 or beam 2 from Ku-band satellite 500 and Ku-band satellite 502. In this example, K-band receiver (Rx) 414 can receive information in one or two beams with a frequency from 17.7 GHz to 21.2 GHz.

As depicted, K-band receiver (Rx) 414 can receive information from K-band satellite 504 and K-band satellite 506. K-band receiver (Rx) 414 can receive information from two beams, beam 1 or beam 2 from K-band satellite 504 and K-band satellite 506. These antennas are connected to optional data switch 523. This optional data switch can switch between the two receivers to download information.

In this example, information can be uploaded using optional data switch 525, which sends information to one of Ku-band transmitter (Tx) 410 and Ka-band transmitter (Tx) 412. In one illustrative example, information can be uploaded to Ku-band transmitter (Tx) 410, which in turns transmits information to Ku-band satellite 508. The transmission can occur in a single frequency from frequency band 14.0 GHz to 14.5 GHz.

In another example, optional data switch 525 can send information to Ka-band transmitter (Tx) 412, which transmits information to Ka-band satellite 510. This communication can occur using a frequency from 27.5 GHz to 31.0 GHz in this example.

With this arrangement of receivers and transmitters, aircraft satellite communications system 401 is capable of providing communications for an aircraft using more than one service. For example, this aircraft satellite communications system is capable of using two different services because of the receivers and transmitters using different satellite bands of interest. In this example, the satellite bands of interest are Ku-, K-, and Ka-band. Further, the selection of multiple receivers and transmitters rather than a single receiver and transmitter also provides an ability to communicate to multiple targets with a fewer number of elements as compared to wideband apertures.

Further, in other illustrative examples, the data switches depicted in this illustration may be omitted. For example, without optional data switch 523, the receivers can all receive one to two beams at the same time and be sent directly to the controller or other system for processing multiple beams. For example, K-band receiver (Rx) 414 and Ku-band receiver (Rx) 416 can operate at the same time to receive multiple beams. Each of these receivers can receive 1 or 2 beams at the same time and process these directly with electronics designed to handle multiple beams.

In a similar fashion, without optional data switch 525, the transmitters can transmit beams at both Ku- and Ka-band at the same time using electronics designed for both bands. With this example, a controller can control uploaded information to both Ku-band transmitter (Tx) 410 and Ka-band transmitter (Tx) 412 and transmit in simultaneous beams in which each transmitter can transmit a beam at the same time as the other transmitter.

Figure 6:
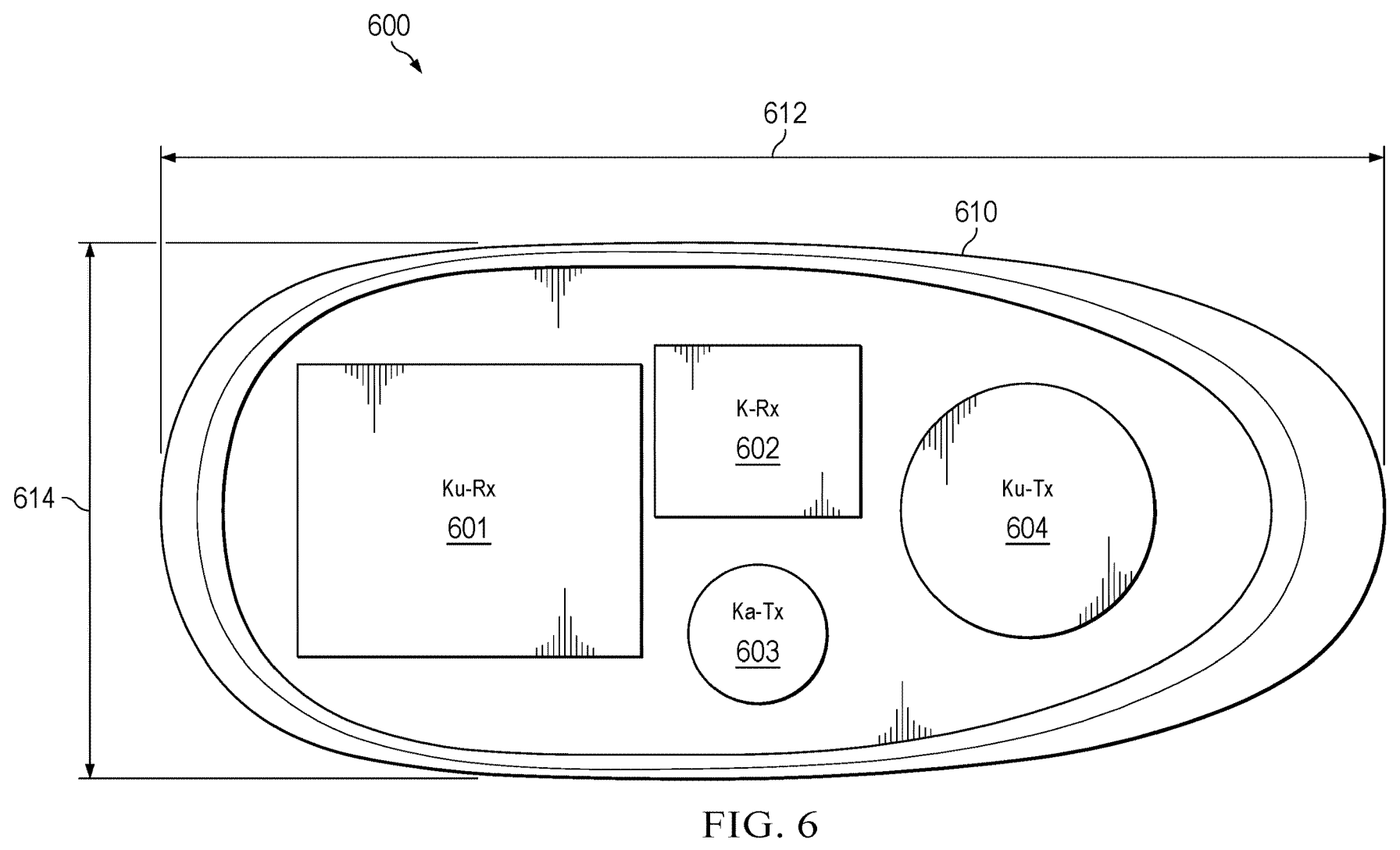

Turning to FIG. 6, an illustration of a top view of an aircraft satellite communications system is depicted in accordance with an illustrative embodiment. In this illustrative example, aircraft satellite communications system 600 is an example of an implementation for aircraft satellite communications system 203 in FIG. 2 and aircraft satellite communications system 302 in FIG. 3.

In this example, aircraft satellite communications system 600 comprises Ku-band receiver (Rx) elements 601, K-band receiver (Rx) elements 602, Ka-band transmitter (Tx) elements 603, and Ku-band transmitter (Tx) elements 604. In this example, Ku-band receiver (Rx) elements 601 and K-band receiver (Rx) elements 602 have a rectangular shape. Ka-band transmitter (Tx) elements 603, and Ku-band transmitter (Tx) elements 604 are shown with a circular aperture shape to reduce the sidelobe levels of an equal amplitude distribution. These components are connected to base structure 610. It should be understood that the actual shape of each of the elements in aircraft satellite communications system 600 comprising Ku-band receiver (Rx) elements 601, K-band receiver (Rx) elements 602, Ka-band transmitter (Tx) elements 603, and Ku-band transmitter (Tx) elements 604, may be of other shapes depending upon the specific design. For example, shapes of ovals, or hexagons, or other shapes may also be used as long as these elements all fit into the ARINC 792 standards.

The transmitter and receiver elements are arranged within this base structure in a manner that provides the least amount of interference between the operation of these components. As depicted, Ku-band receiver (Rx) elements 601 are located at opposite ends of the base structure 610 from Ku-band transmitter (Tx) elements 604. Further in this example, K-band receiver (Rx) elements 602 and Ka-band transmitter (Tx) elements 603 are located on base structure 610 between Ku-band receiver (Rx) elements 601 and Ku-band transmitter (Tx) elements 604.

As depicted, base structure 610 has length 612 of 96 inches and width 614 of 42 inches. In this example, these dimensions meet the ARINC 792 standard. The dimensions for the transmitter and receiver elements can take different forms that meet the ARINC 792 standard.

This example, K-band receiver (Rx) elements 602 and Ka-band transmitter (Tx) elements 603 are located on base structure 610 between Ku-band receiver (Rx) elements 601 and Ku-band transmitter (Tx) elements 604 which provide a total usable bandwidth of 15 GHz. This bandwidth can be provided using two Ku-band receiver beams, two K-band receiver beams, a Ku-band transmitter beam, and a Ka-band transmitter beam.

When dual beams are received, all of the elements in a receiver may be used to receive the two beams. In this example, every element has a hybrid-coupler providing left- and right-hand polarization to two phase-shifters. Each phase-shifter carries the independent signals to electronics and separate distribution networks for the two independent beams. Thus, all the elements can receive two different beams with the electronics, phase shifters, and distribution networks deriving each individual beam as a separate signal from a specific direction. In one example, all of the elements can be used to receive communications from a GEO, a MEO, or a LEO satellite.

In another example, the aperture can be subdivided into groups of elements to form multiple apertures that are sub apertures for receiving communications with GEO, MEO, or LEO satellites.

In this example, Ku-band, K-band, and Ka-band apertures are selected to fit within the area available on the ARINC 792 standard. In one example, an array of about 2300 elements is selected for a Ku-band single receive aperture in a lattice supporting grating-lobe free scanning to 72 degrees.

Further in this example, a full-duplex operation is provided by Ku-band receiver (Rx) elements 601 and Ku-band transmitter (Tx) elements 604. In this example, Ku-band receiver (Rx) elements 601 is a single receiver (Rx) aperture with 2300 elements. These elements and corresponding circuitry support dual-beam operation.

In this example, Ku-transmitter (Tx) elements 604 has a single circular aperture with about 1500 elements.

In this example, a full-duplex operation is provided in the K-band using K-band receiver (Rx) elements 602 and Ka-band transmitter (Tx) elements 603. In this example, K-band receiver (Rx) elements 602 has a single receiver aperture with 2300 elements.

In this example, Ka-band transmitter (Tx) elements 603 has a single transmitter aperture with 2100 elements.

In this depicted example, aircraft satellite communications system 600 can be implemented using approximately 8200 elements within the ARINC-792 footprint. This aircraft satellite communications system provides full-duplex operation. In other words, the system can transmit and receive information at the same time. In one example, aircraft satellite communications system 600 has 2300 elements per satellite band with grating-lobe free scanning to 72 degrees. In one example, this system provides simultaneous dual-beam at Ku-band Rx and K-band Rx with single, switchable beams at Ku-band Tx and Ka-band Tx. This system provides optimized narrow-band, single-function performance.

In the illustrative example, aircraft satellite communications system 600 meets ARINC 792 standards. In meeting this standard, aircraft satellite communications system 600 provides at least one of increased usable bandwidth, uses fewer elements for receivers and transmitters, provides a simpler array implementation for antenna elements, provides independently optimized arrays of elements, or decreased cost as compared to other currently available implementations. One or more of these advantages are provided over other aircraft satellite communications systems meeting ARINC 792 standards.

For example, these advantages can be present as compared to a multiband full duplex aircraft satellite communications system that uses a receiver and a transmitter in which each of these components communicate using satellite bands for communications. This multiband aircraft satellite communications system of two wideband apertures, when compared to the earlier example, uses 23% less area but has 86% more radiating elements.

For comparison, this multiband aircraft satellite communications system has 23% less area and has 86% more elements than aircraft satellite communications system 600. Further, this multiband aircraft satellite communications system has a higher front-end loss due to wider band requirements on the radiators over the entire scan volume. Full-duplex operation uses Ku-band Rx/Ku-band Tx or K-band Rx/Ka-band Tx. This multiband aircraft satellite communications system provides wideband communication with a single function. This system has a total usable bandwidth of less than or equal to 10.5 GHz.

For further comparison, the advantages of aircraft satellite communications system 600 can be shown over a wideband multiband multifunction aircraft satellite communications system in which a single component operates both as a receiver and a transmitter using the satellite band. This multiband multifunction aircraft satellite communications system uses about 56% less aperture area but uses 50% more elements. This type of system, however, only operates in a half-duplex mode. The system uses a circulator and filter to fit within the unit-cell footprint and a switch to provide sufficient transmit to receive isolation.

This multiband, multifunction aircraft satellite communications system uses 56% less area and has 50% more elements than apertures in aircraft satellite communications system 600. This system has much-higher front-end losses due to switch and filter needs and with impedance variations over the scan-angles. This system provides a very wideband, multi-function operation with a total usable bandwidth significantly less than 10.5 GHz in half-duplex operation.

In this illustrative example, the wideband, single array in the multiband, multifunction aircraft satellite communications system is smaller in area but requires more elements because the wide-beam scanning requirements are set at the highest operating frequency (31 GHz) as compared to using multiple arrays with a larger footprint but with fewer elements.

The differences in the number of antenna elements affect costs directly. Since, each radiator element includes amplifiers, phase-shifters, controllers, and other components, the multi-band, multi-function will include 50% more components.

In contrast, the multiple single-function, single-band arrays of the illustrative example include fewer elements over a larger aperture area. Therefore, if a sufficient area is present as in the ARINC-792 standard, the multiple arrays of the illustrative example are a much more cost effective affordable solution.

By comparison, using the ARINC-792 standard, a single large multi-function array in a multiband aircraft satellite communications system that covers both transmit and receive and operates from Ku-band to Ka-band requires more elements and is more complex and expensive than the illustrative example. Also, by comparison, a multi-band approach with a single, large receive array which covers Ku-band to the K-band and another transmit array that covers Ku-band to Ka-band will also require more elements and be more complex and more expensive than the illustrative example.

Further in these examples, a Ku-Tx transmitter and Ka-Tx transmitter are the transmit phased-array systems (14-14.5 GHz, 27-31 GHz). A baseband transmitter operating over a 1 GHz bandwidth can be used in an illustrative example. With this example, a Ku-band up-converter (baseband to 14 GHz) can be used for the Ku-Tx transmitter. This signal is distributed with a radio frequency (FR) network to every radiator element where amplifiers and phase-shifters to augment or amplify the signal for transmission. Similarly, a Ka-band upconverter (baseband to 27 GHz) would be used for the Ka-Tx transmitter. This signal is distributed with a radio frequency (RF) network to every radiator element where amplifiers and phase-shifters augment or amplify the signal for transmission. In addition, the Ka-band upconverter can be tuned to cover the entire 4 GHz of Ka-band bandwidth.

In one illustrative example, a Ku-Rx receiver and a K-Rx receiver are receive phased-array systems (10.7-12.7 GHz, 17.7-21.2 GHz). If the baseband receiver has a 1 GHz bandwidth, a Ku-band down-converter (10.7 to baseband) can be used. With this example, the received signal at every element is amplified, phase-shifted and combined with a radio frequency (RF) network. The aggregated signal is down-converted for the receiver. The down-converter is tuned to cover the entire 2 GHz bandwidth. Similarly, a received Ka-band signal at every radiator element is amplified, phase-shifted and combined with a radio frequency (RF) network. The aggregated signal feeds a Ka-band down-converter (27 to baseband) for the receiver. The down-converter is tuned to cover the entire 4 GHz of bandwidth. The entire analog network from LNA, phase-shifter, RF combiner network is be replicated for each independent beam in these examples.

Aircraft communications systems such as a multiband or multiband multifunction system are potential configurations may provide advantages over currently available aircraft satellite communications systems. However, these aircraft satellite communications systems do not provide communications capabilities and bandwidth as described in one or more of the illustrative examples.

Thus, an aircraft satellite communications system, such as aircraft satellite communications system 600, that has multiple receivers and multiple transmitters to independently cover the different satellite bands will have less elements, improved power and noise figures (as compared to an amplifier covering a larger operating bandwidth), and therefore better performance. In these examples, sufficient area is assumed to be available for the separate arrays. Furthermore, in the illustrative example, connections from the aircraft to the satellites with up to four receive streams (2 Ku-band streams, 2 K-band streams) and up to 2 transmit streams (Ku-band stream, Ka-band stream) can be used because each array is independent in aircraft satellite communications system 600.

Figure 7:
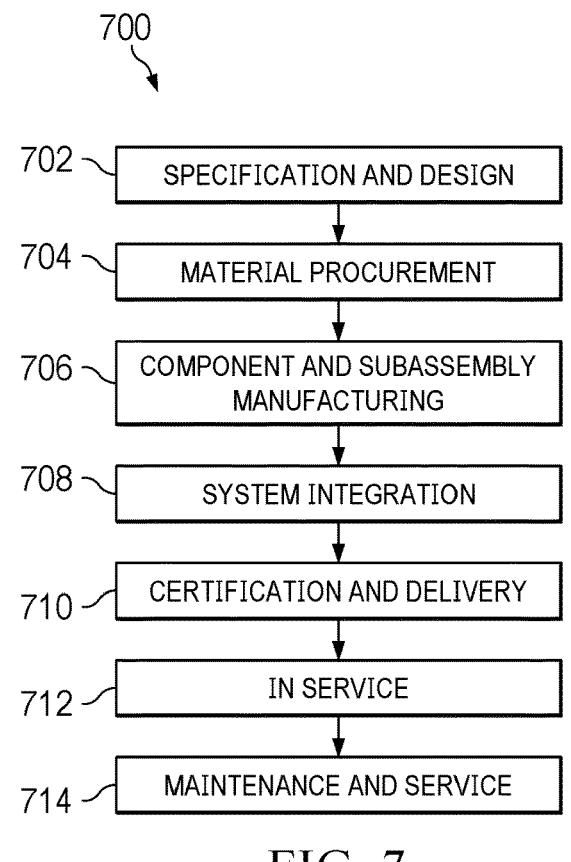
FIG. 7 is an illustration of an aircraft manufacturing and service method in accordance with an illustrative embodiment.
Figure 8:
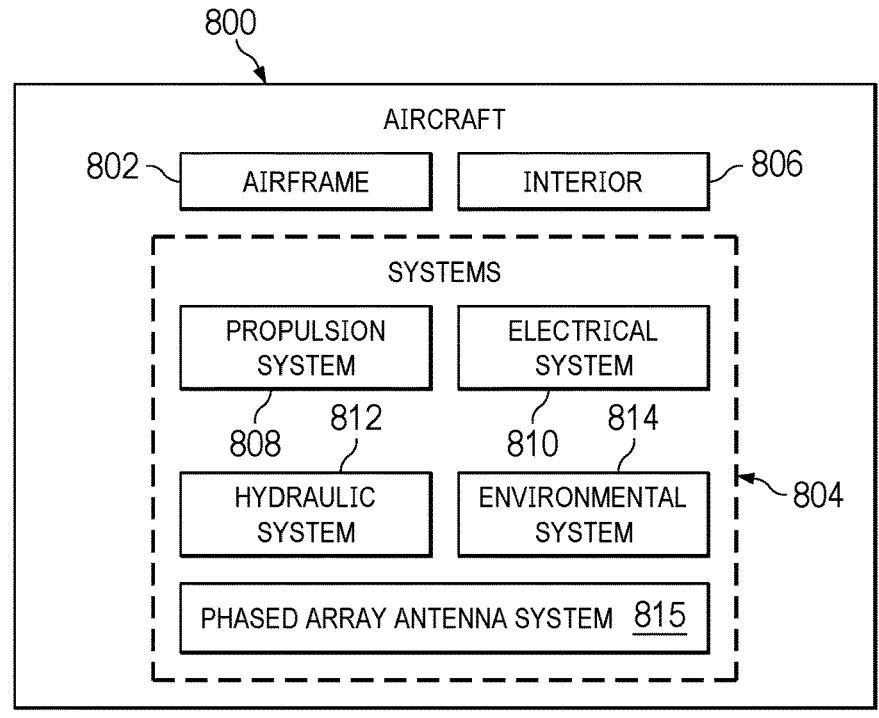
FIG. 8 is an illustration of a block diagram of an aircraft in which an illustrative embodiment may be implemented.

The illustrative embodiments of the disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 in FIG. 8 takes place. Thereafter, aircraft 800 in FIG. 8 can go through certification and delivery 710 in order to be placed in service 712. While in service 712 by a customer, aircraft 800 in FIG. 8 is scheduled for routine maintenance and service 714, which may include modification, reconfiguration, refurbishment, and other maintenance or service.

Each of the processes of aircraft manufacturing and service method 700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in which an illustrative embodiment may be implemented. In this example, aircraft 800 is produced by aircraft manufacturing and service method 700 in FIG. 7 and may include airframe 802 with plurality of systems 804 and interior 806. Examples of systems 804 include one or more of propulsion system 808, electrical system 810, hydraulic system 812, environmental system 814, and phased array antenna system 815. Any number of other systems may be included. In this example, phased array antenna system 815 can be implemented using phased array antennas 208 in FIG. 2.

Although an aerospace example is shown, different illustrative embodiments may be applied to other industries. These other industries can be, for example, the ship, spacecraft, or automotive industry.

Apparatuses and methods embodied herein may be employed during at least one of the stages of aircraft manufacturing and service method 700 in FIG. 7.

In one illustrative example, components or subassemblies produced in component and subassembly manufacturing 706 in FIG. 7 can be fabricated or manufactured in a manner similar to components or subassemblies produced while aircraft 800 is in service 712 in FIG. 7. As yet another example, one or more apparatus embodiments, method embodiments, or a combination thereof can be utilized during production stages, such as component and subassembly manufacturing 706 and system integration 708 in FIG. 7. One or more apparatus embodiments, method embodiments, or a combination thereof may be utilized while aircraft 800 is in service 712, during maintenance and service 714 in FIG. 7, or both. The use of a number of the different illustrative embodiments may substantially expedite the assembly of aircraft 800, reduce the cost of aircraft 800, or both expedite the assembly of aircraft 800 and reduce the cost of aircraft 800.

For example, components for a phased array antenna system 815 for satellite communications can be manufactured during component and subassembly manufacturing 706 and installed during system integration 708. As another example, phased array antenna system 815 in the illustrative example can be added during maintenance and service 714. This addition can be part of modification, reconfiguration, refurbishment, or other maintenance or service of aircraft 800.

Thus, one or more illustrative examples can provide increased communications for aircraft. The satellite antenna system is implemented as a phased array antenna system in the different examples. This phased array antenna system has multiple transmitters and receivers and can support communications over different satellite bands such as Ku- and Ka-band. This phased array antenna system is packaged to fit within the footprint of an existing radome. However, it can operate without a radome and provides lighting-strike and bird-strike protection. Additionally, the base structure for connecting the phased array antenna system has connectors that correspond to connection points on the aircraft. As a result, certification of the phased array antenna system may be unnecessary.

With the ability to use multiple satellite bands, increased options are available to airlines using aircraft with this phased array antenna system. For example, an airline does not need to change the phased array antenna system on an aircraft based on whether the potential provider uses the Ku-band or Ka-band when the phased array antenna system includes transmitters and receivers for both bands. As a result, having a particular type of hardware is not a limiting factor in the different illustrative examples. Further, the ability to have multiple transmitters and receivers of the same type can increase bandwidth and provide redundancy.

Thus, the illustrative examples provide an improved aircraft satellite communications system that communicates using satellite frequency bands. The satellite frequency bands can cover the desired bands needed to provide service to aircraft from multiple service providers. The aircraft satellite communications system comprises a base structure, transmitters, and receivers. The base structure has connectors arranged to correspond to connection points on an aircraft. The transmitters are connected to the base structure. The transmitters are configured to transmit using a first plurality of the satellite frequency bands. The receivers are connected to the base structure. The receivers are configured to receive using a second plurality of the satellite frequency bands. A selected transmitter in the transmitters transmits using a satellite frequency band in the satellite frequency bands is positioned at a distance from a selected receiver in the receivers using the satellite frequency band in the satellite frequency bands on the base structure with a number of other transmitters and receivers located between the selected transmitter and the selected receiver on the base structure.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft satellite communications system that communicates on satellite frequency bands, wherein the aircraft satellite communications system comprises:

a base structure that comprises connectors arranged to correspond to connection points on an aircraft;

transmitters connected to the base structure, wherein the transmitters are configured to transmit using a first plurality of the satellite frequency bands, wherein the transmitters comprise a Ka-band transmitter configured to transmit on a Ka band;

receivers connected to the base structure, wherein the receivers are configured to receive on a second plurality of the satellite frequency bands and comprise a K-band receiver configured to receive on the K band; wherein a Ku-band transmitter in the transmitters configured to transmit on a satellite frequency band in the satellite frequency bands is positioned on an opposite end of the base structure from a Ku-band receiver in the receivers with a number of other transmitters and receivers comprising the Ka-band transmitter and the K-band receiver located between the Ku-band transmitter and the Ku-band receiver on the base structure.

2. The aircraft satellite communications system of claim 1 further comprising:

a radome covering the transmitters and the receivers connected to the base structure.

3. The aircraft satellite communications system of claim 2, wherein the base structure, the transmitters, the receivers, and the radome meet an ARINC 792 standard.

4. The aircraft satellite communications system of claim 1, wherein the Ku-band transmitter is located on the end of the base structure nearest to the front of the aircraft.

5. The aircraft satellite communications system of claim 1, wherein the transmitters and the receivers are positioned such that interference between the transmitters and the receivers is reduced.

6. The aircraft satellite communications system of claim 1, wherein the base structure is connected to a top surface of an aircraft.

7. The aircraft satellite communications system of claim 6, wherein the base structure comprises two transmitters.

8. The aircraft satellite communications system of claim 1, wherein the the Ka-band transmitter and the K-band receiver are located on opposite sides of the base structure.

9. The aircraft satellite communications system of claim 1 further comprising:

a controller configured to:

subdivide transmit elements in a transmitter in the transmitters into multiple apertures; and transmit information from the transmitter in a number of beams using a number of the multiple apertures.

10. The aircraft satellite communications system of claim 9, wherein the controller is configured to:

select an aperture size for an aperture that enables using amplifiers for the transmit elements in the aperture at a power level that saturates the amplifiers for the transmit elements in the aperture in emitting a beam in the number of beams at a satellite with a desired level of power for a satellite type for the satellite.

11. The aircraft satellite communications system of claim 1 further comprising:

a controller configured to:

subdivide receive elements in a receiver in the receivers into multiple apertures; and receive information from a number of beams using a number of the multiple apertures.

12. The aircraft satellite communications system of claim 1, wherein a receiver in the receivers simultaneously receives multiple beams.

13. The aircraft satellite communications system of claim 1, wherein the transmitters and receivers are formed from phased array antennas.

14. The aircraft satellite communications system of claim 1, wherein the satellite frequency bands used by the aircraft satellite communications system form a wideband.

15. The aircraft satellite communications system of claim 1, wherein the aircraft is selected from a group comprising a commercial airplane, a cargo airplane, a tilt-rotor aircraft, a tilt wing aircraft, a military air vehicle, a vertical takeoff and landing aircraft, an unmanned aerial vehicle, a drone, an electric vertical takeoff and landing vehicle, and a personal air vehicle.

16. An aircraft satellite communications system that comprises:

a base structure that comprises connectors arranged to correspond to connection points on an aircraft;

a Ku-band transmitter connected to an end of the base structure, wherein the Ku-band transmitter transmits using a Ku satellite band;

a Ka-band transmitter connected in a center area of the base structure, wherein the Ka-band transmitter transmits using a Ka satellite band;

a Ku-band receiver connected to an opposite end of the base structure, wherein the Ku-band receiver receives using the Ku satellite band; and a K-band receiver connected in a center area of the base structure, wherein the K-band receiver receives using a K satellite band.

17. The aircraft satellite communications system of claim 16, wherein the base structure having connectors arranged to correspond to connection points on an aircraft is such that recertification is unnecessary.

18. The aircraft satellite communications system of claim 16, wherein the base structure, the Ku-band transmitter, the Ka-band transmitter, the Ku-band receiver, and the K-band receiver meet ARINC 792 standard.

19. The aircraft satellite communications system of claim 16, wherein the base structure is connected to the Ku transmitter, the Ka-band transmitter, the Ku-band receiver, and the K receiver, and wherein the Ku-band transmitter, the Ka-band transmitter, the Ku-band receiver, and the K-band receiver fit within an existing radome of the aircraft when the connectors for the base structure are connected to the connection points on the aircraft.

20. The aircraft satellite communications system of claim 16 further comprising:

a thermal management system.

21. The aircraft satellite communications system of claim 16 further comprising:

a controller in communication with the Ku transmitter, the Ka-band transmitter, the Ku-band receiver, and the K-band receiver, wherein the controller is configured to:

control the Ku-band transmitter and the Ka-band transmitter to emit first radio frequency beams; and control the Ku-band receiver and the K-band receiver to receive second radio frequency beams.

* * * * *